United States Patent
Algrisi

(10) Patent No.: US 9,169,655 B2
(45) Date of Patent: Oct. 27, 2015

(54) FLOOR, FLOOR ELEMENT, METHOD OF CONNECTING A FLOOR ELEMENT TO A SURFACE BENEATH THE FLOOR ELEMENT, METHOD OF MANUFACTURING A FLOOR ELEMENT AND KIT-OF PARTS

(71) Applicant: NEW SPIRIT CHINA LTD., Shanghai (CN)

(72) Inventor: Shahar Algrisi, Amsterdam (NL)

(73) Assignee: NEW SPIRIT CHINA LTD., Shanghai (CN)

( * ) Notice: Subject to any disclaimer, the term of this patent is extended or adjusted under 35 U.S.C. 154(b) by 0 days.

(21) Appl. No.: 14/046,135

(22) Filed: Oct. 4, 2013

(65) Prior Publication Data
US 2014/0099487 A1    Apr. 10, 2014

(30) Foreign Application Priority Data
Oct. 4, 2012    (NL) .................................... 2009569

(51) Int. Cl.
| | |
|---|---|
| *B32B 3/00* | (2006.01) |
| *E04F 15/02* | (2006.01) |
| *C09J 11/08* | (2006.01) |
| *E04F 15/20* | (2006.01) |
| *E04F 15/22* | (2006.01) |
| *C08K 7/00* | (2006.01) |

(52) U.S. Cl.
CPC ........... *E04F 15/02155* (2013.01); *C09J 11/08* (2013.01); *E04F 15/0215* (2013.01); *E04F 15/20* (2013.01); *E04F 15/22* (2013.01); *C08K 7/00* (2013.01); *Y10T 428/24851* (2015.01); *Y10T 428/24893* (2015.01)

(58) Field of Classification Search
CPC ............ E04F 15/10; Y10T 428/24851; Y10T 428/24893
See application file for complete search history.

(56) References Cited

U.S. PATENT DOCUMENTS

| | | |
|---|---|---|
| 2,127,433 A | 8/1938 | Sky |
| 2005/0089678 A1 | 4/2005 | Mead |
| 2011/0154772 A1 | 6/2011 | Lontchar et al. |

FOREIGN PATENT DOCUMENTS

| | | |
|---|---|---|
| EP | 1 209 301 A2 | 5/2002 |
| FR | 2787116 A1 | 6/2000 |
| JP | 2972186 B | 8/1999 |
| WO | 2012/007414 A2 | 1/2012 |

OTHER PUBLICATIONS

Netherlands Search Report; dated Jun. 14, 2013; Patent Appln. No. NO 138461 NL 2009569.

*Primary Examiner* — Elizabeth Mulvaney
(74) *Attorney, Agent, or Firm* — Ladas & Parry LLP

(57) ABSTRACT

The present invention relates to a floor (10) comprising at least one floor element (12) and an adhesive composition (16), wherein the at least one floor element is adhesively connected to a surface (15) below the floor element via the adhesive composition, wherein the adhesive composition comprises a mixture of:
 an adhesive (18), and
 multiple resilient particles (20) which support the floor elements,
wherein the multiple resilient particles (20) are configured to support the floor elements at a distance (22) from the surface (15), wherein the particles have different shapes and varying sizes, wherein a part of the space (24) between the surface below the floor elements and the floor elements is filled with the adhesive composition (16) and a part of the space is filled with air (26).

13 Claims, 8 Drawing Sheets

FLOOR, FLOOR ELEMENT, METHOD OF CONNECTING A FLOOR ELEMENT TO A SURFACE BENEATH THE FLOOR ELEMENT, METHOD OF MANUFACTURING A FLOOR ELEMENT AND KIT-OF PARTS

FIELD OF THE ART

The present invention relates to floors which are adhesively connected (or glued) to the ground with an adhesive. Such floors are known per se. The floor elements may be wooden planks or other floor elements.

DESCRIPTION OF THE PRIOR ART

US2011/0154772A2 discloses an adhesive composition comprising spacer particles.

THE INVENTION

Glued floors are widely used because they offer the advantage of being strong and stable. Glued floors react less to temperature or humidity changes. Wooden floors, in particular parquet floors, are often glued. Another advantage is that a glued floor works well with floor heating, because the heat can be transferred to the room better than with a "floating floor".

A known disadvantage of glued floors is impact noise. The noise of the impact of feet on the floor is transferred directly to the construction underneath the floor, and is relatively loud in the room underneath the floor and also in the rooms adjacent the room where the floor is in.

Apart from the impact noise, vibrations also occur which can be felt in the room beneath the floor and in the rooms adjacent the room where the floor is in. Said vibrations are also quite strong for glued floors.

This known problem in practice is often aggravated because during the laying of the floor elements, the adhesive is often not perfectly distributed over the surface area. This leads to imperfections in the glue layer. These imperfections may result in a floor element which directly contacts the surface below the floor element in a part of the surface area of the floor element. The direct contact with the surface below the floor element results in even more impact noise in the room beneath the floor and adjacent the room where the floor is in.

Such an imperfection may also occur in case the glue is distributed evenly, but shortly after the laying of the floor element and prior to the hardening of the glue, a load is placed on the floor element. If for instance a person walks on the floor while the glue is still soft, the floor element may permanently contact the surface below the floor element, resulting in the same noise problem.

Therefore, glued floors in practice create a lot of impact noise and vibrations. For this reason, in some countries, glued floors are banned from being used in apartment buildings.

It was recognized in the present invention that improvements can be made which reduce these problems.

US2011/0154772 discloses an adhesive composition comprising spacer particles. In the present invention it was recognized that in US2011/0154772 the full potential of the combination of an adhesive and resilient particles is not used, resulting in sub-optimal noise reduction. The method of manufacturing and laying a floor according to US2011/0154772 is quite primitive. It was recognized that with an improved method of manufacturing the floor elements and laying the floor elements, a floor is possible which is easier to install and which also has a better noise reduction.

The present invention relates to a floor comprising at least one floor element and an adhesive composition, wherein the at least one floor element is adhesively connected to a surface below the floor element via the adhesive composition, wherein the adhesive composition comprises a mixture of:
  an adhesive, and
  multiple resilient particles which support the floor elements.

The multiple resilient particles are configured to support the floor elements at a distance from the surface, wherein the particles have different shapes and varying sizes, wherein a part of the space between the surface below the floor elements and the floor elements is filled with the adhesive composition and a part of the space is filled with air.

The invention is based on the insight that the combination of resilient particles and the use of air further improves the impact noise. In contrast, US2011/0154772 explicitly teaches away from using air between the resilient particles in order to avoid vapor problems, see paragraphs 2-7 of US2011/0154772.

The term "floor element" is defined to relate to an element of which the upper side forms the upper surface of a floor, but also to define an element used for a sublayer of a glued floor such as a hardboard or chipboard panel on top of which a floor element is glued which forms a top layer of the floor.

The term "floor" also relates to a part of a stair which is covered with a floor element.

In an embodiment, the resilient particles are configured to support the floor elements at a distance from the surface below the floor element, in particular a distance of at least 0.5 mm. The resilient particles act as spacers which keep the floor elements at a distance from the surface underneath the floor element during and after the laying of the floor. Furthermore, the resilient particles also reduce the total contact area between the floor and the surface beneath the floor, thereby reducing impact noise and vibrations.

In an embodiment, a further advantage is that adhesive is saved, in the order of 5-30 percent. The resilient particles may be from an inexpensive material, such as recycled rubber, which may replace an amount of adhesive which is a relatively expensive substance. As a result, the total price of the floor will be reduced.

In one embodiment, the at least one floor element is adhesively connected directly and without any intermediate layer to the underground via the adhesive composition.

In another embodiment, the at least one floor element is adhesively connected to a subpanel (or intermediate layer) via the adhesive composition. In this embodiment the floor element typically is a top element which forms the top layer of the floor. The subpanel may be a hardboard or chipboard panel or another panel. In another embodiment, the subpanel is adhesively connected to the underground via a second adhesive connection comprising said adhesive composition.

In an embodiment, the particles have a resilience greater than the resilience of the adhesive. In an embodiment, the resilient particles comprise rubber particles, cork particles or soft plastic particles. In an embodiment, the resilient particles have an average length of between 0.5 and 5 mm, in particular between 1 and 3 mm. In an embodiment, the resilient particles have a different shapes and a somewhat varying size. In another embodiment, the resilient particles have a substantially equal size and shape.

In an embodiment, the particles are non-spherical, and in particular have an irregular shape. The particles may be elongate. In an embodiment, the average length is more than 1.5 time the average width.

In an embodiment, the particles are jagged, in particular elongate and jagged. It was surprisingly found that this shape has a benefit of an easier laying process, because floor elements stay in their desired position while also having the possibility to be moved sideways if needed. With spherical particles, it is difficult to keep the floor element in the desired position, because it tends to move sideways too easy. The laying process becomes even easier if the particles have a varying shape.

In an embodiment, the adhesive is an adhesive which stays resilient after the connecting of the floor elements to the surface below the floor element.

In an embodiment, the distance between the floor element and the surface below the floor element is between 0.5 mm and 5 mm, in particular between 0.7 and 3 mm.

In an embodiment, multiple resilient particles contact the surface below the floor element with a lower end thereof and contact one of the floor elements with an upper end thereof and are compressed between the floor element and the surface below the floor element, the local force being transferred from the floor element to the surface below the floor element via a single resilient particle. In this embodiment, said particles have a size in the uncompressed state which is greater than the distance between the floor element and the surface below the floor element.

In another embodiment, the resilient particles are substantially smaller than the distance between the floor element and the surface below the floor element, such that the local force is transferred from the floor element to the surface below the floor element via a chain of resilient particles stacked on top of one another in the adhesive composition.

In an embodiment, the resilient particles form 5-40 percent by volume of the adhesive composition, in particular 10-20 percent by volume, more in particular 12-15 percent by volume. In an embodiment, the resilient particles form 2-10 percent by weight of the adhesive composition, in particular 3-6 percent by weight. In an embodiment, the adhesive composition contacts only a part of the surface area of the surface below the floor element, in particular 5-50 percent of the surface area (A) of the surface below the floor element.

The present invention further relates to a method of connecting one or more floor elements to the surface below the floor element, the method comprising:
- providing one or more floor elements,
- providing an adhesive composition which comprises a mixture of:
  - an adhesive suitable for adhering floor elements to a surface below the floor element,
  - multiple resilient particles configured to support the floor elements,
- applying the adhesive composition on the surface below the floor element or on the underside of the one or more floor elements,
- placing the one or more floor elements on the ground, wherein the resilient particles support the floor elements.

In an embodiment, the method comprises adhesively connecting the at least one floor element directly and without any intermediate layer to the underground via the adhesive composition.

In an embodiment of the method, the adhesive and the resilient particles are transported to the location where the floor is to be made separately and are mixed into the adhesive composition at said location.

In an embodiment of the method, the adhesive composition covers only a part of the surface area (A) of the surface below the floor element, in particular 5-50 percent of the surface area of the surface below the floor element.

In an embodiment of the method, the adhesive composition is applied in ridges, wherein a distance between the ridges is at least equal to a width of the ridges. In a further embodiment, the distance between the ridges is at least equal to a height of the ridges.

In a further aspect, the present invention relates to a floor element, comprising a panel and multiple resilient particles which are adhesively connected via an adhesive to an underside of the panel.

In an embodiment, the multiple resilient particles are a strewable material.

In an embodiment, the multiple resilient particles are randomly scattered.

In an embodiment, interspaces of air are located between the multiple resilient particles.

In an embodiment, the interspaces of air are substantially interconnected with one another.

In an embodiment, a substantial part of the multiple resilient particles are not connected to one another, but only connected to the underside of the board.

In an embodiment, the resilient particles have an average length of between 0.5 and 5 mm, in particular between 1 and 3 mm.

In an embodiment, 5-60 percent of the underside is visible.

In an embodiment, the particles project from the layer of adhesive over an average distance which is at least twice the average thickness of the layer of adhesive.

The present invention further relates to a floor comprising multiple floor elements according to any of claims 33-41, wherein the floor elements are glued to the ground or to a subpanel via a second layer of adhesive.

The present invention further relates to a method of manufacturing a floor element, the method comprising:
- providing a panel,
- applying adhesive to the underside of the panel, and
- providing multiple resilient particles on the underside, wherein the multiple resilient particles are adhesively connected to the underside.

In an embodiment of the method of manufacturing a floor element, the step of applying the adhesive and the step of providing the multiple resilient particles on the underside are distinct steps which follow one another in time.

In an embodiment of the method of manufacturing a floor element, the multiple resilient particles are a strewable material.

In an embodiment of the method of manufacturing a floor element, the multiple resilient particles are strewn over the underside.

In an embodiment of the method of manufacturing a floor element, the multiple resilient particles are randomly scattered.

In an embodiment of the method of manufacturing a floor element, interspaces of air are located between the multiple resilient particles.

In an embodiment of the method of manufacturing a floor element, the interspaces of air are substantially interconnected with one another.

In an embodiment of the method of manufacturing a floor element, a substantial part of the multiple resilient particles are not connected to one another, but only connected to the underside of the board.

In an embodiment of the method of manufacturing a floor element, the resilient particles have an average length of between 0.5 and 5 mm, in particular between 1 and 3 mm.

In an embodiment of the method of manufacturing a floor element, 5-60 percent of the underside is visible.

In another aspect, an adhesive composition is provided for connecting one or more floor elements to the ground, wherein the adhesive composition comprises a mixture of:
an adhesive, and
multiple resilient particles configured to support the floor elements.

The adhesive composition allows glued floors which have less impact noise.

In an embodiment, the resilient particles are constructed to support the floor elements at a distance from the ground, in particular at a distance of at least 0.5 mm.

In an embodiment of the adhesive composition, the resilient particles have a resilience which is greater than the resilience of the adhesive when the adhesive is still soft. In an embodiment of the adhesive composition, the particles comprise rubber particles, cork particles or soft plastic particles.

In an embodiment of the adhesive composition, the adhesive is an adhesive which stays resilient after application. In an embodiment of the adhesive composition, the resilient particles form 5-40 percent by volume of the adhesive composition, in particular 10-20 percent by volume, more in particular 12-15 percent by volume.

In an embodiment of the adhesive composition, the resilient particles have an average length of between 0.5 and 5 mm, in particular between 1 and 3 mm.

In an embodiment, the adhesive composition makes it easier to level a floor element, i.e. to orient the floor element horizontally, The sub-surface below the floor element often has small imperfections, i.e. small variances in height. With the adhesive composition, small differences in height of the subsurface do not result in an inclined orientation of the floor element.

The present invention further relates to a kit-of-parts for making an adhesive composition for connecting one or more floor elements to the surface below the floor element, the kit-of-parts comprising:
an adhesive, and
multiple resilient particles configured to support the floor elements.

In an embodiment, the resilient particles are configured to support the floor elements at a distance from the surface below the floor element, in particular at a distance of at least 0.5 mm.

LIST OF FIGURES

The previous and other features and advantages of the present invention will be more fully understood from the following detailed description of exemplary embodiment with reference to the attached drawing.

DETAILED DESCRIPTION OF THE FIGURES

First Embodiment

Figure 1A:
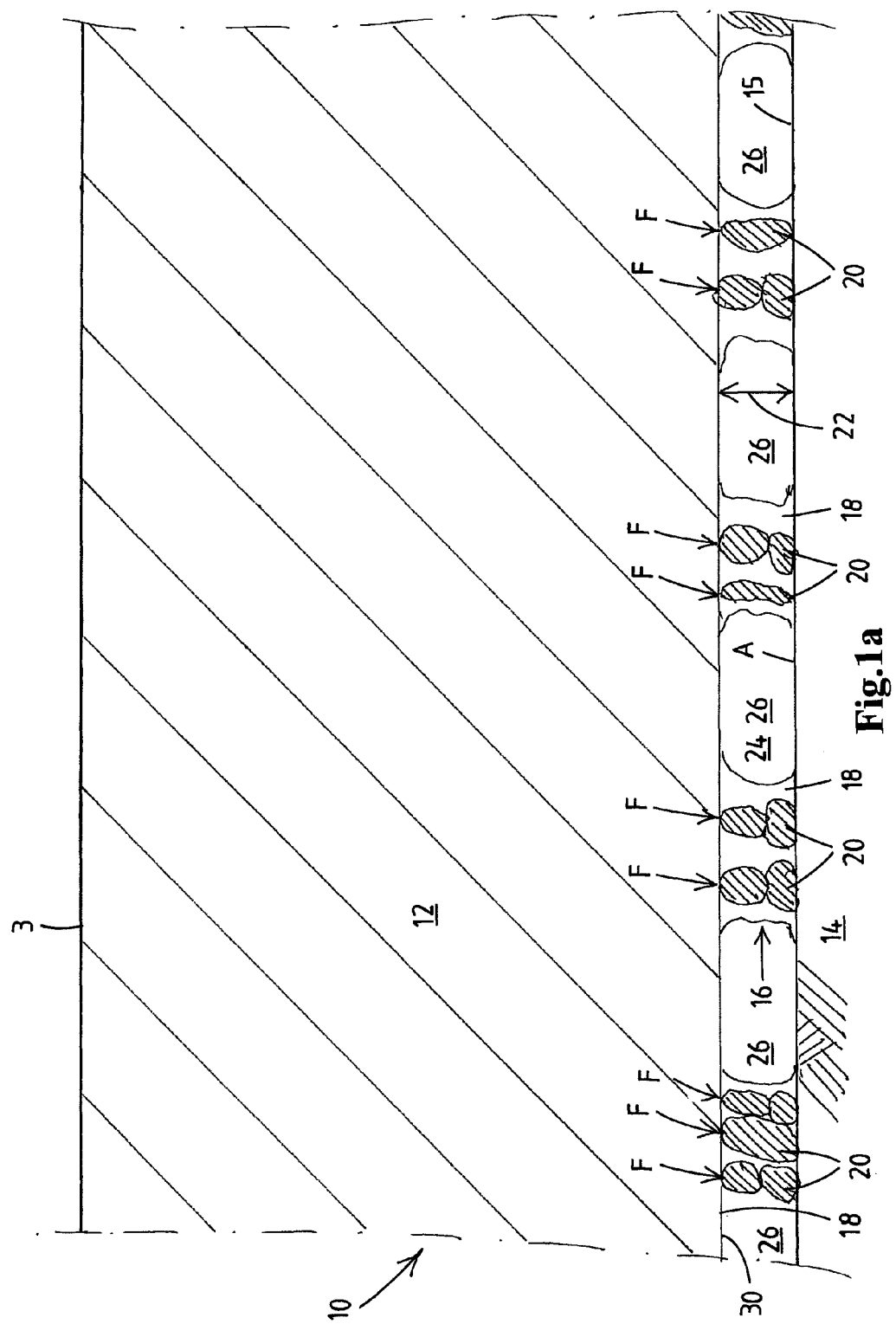
FIG. 1A shows a cross section of a floor according to the invention.

Turning to FIG. 1A, a floor 10 comprises one or more floor elements 12. The floor elements 12 may be wood elements, tiles, stone elements, synthetic elements, laminate elements or other elements. The floor elements form a floor on which a user can walk, place furniture, etc.

The floor elements 12 are glued, i.e. adhesively connected, to the surface 15 of the ground 14. The ground 14 may be a concrete base or a similar type of base on which the floor 10 rests. The ground has a surface A.

The floor 10 has a same surface A. The floor has an underside 30 and a top side 31. For the adhesive connection between the floor elements 12 and the surface 15, an adhesive composition 16 comprising a mixture of an adhesive 18 and resilient particles 20 is used. The adhesive composition substantially surrounds the resilient particles. The particles 20 may also be indicated as granules. The adhesive composition 16 is arranged in ridges, as will be explained in more detail in relation to FIG. 2.

The weight of the floor 10 is transferred for the greater part via the resilient particles 20 to the ground 14, indicated by F in FIG. 1. Nevertheless, the adhesive 18 itself may also transfer a part of the total load from the floor elements 12 to the ground 14.

The resilient particles act as spacer elements inside the adhesive and keep the floor element 12 at a distance 22 from the ground 14. The distance 22 typically lies between 0.5 mm and 5 mm, in particular between 0.7 and 3 mm.

In the shown embodiment, the volume 24 between the floor element 12 and the ground 14 is partly filled with adhesive 18, partly filled with particles 20 and partly filled with air. The areas with air may be compartmentalized in separate air pockets 26, but may also be interconnected.

Some of the individual resilient particles contact both the floor element 12 and the ground 14 and span the distance 22. In this case, the local force F will be transferred from the floor elements to the ground via a single particle. The combined load of the local forces F will be transferred via multiple particles. Some of the resilient particles are stacked upon another resilient particle and contact only the floor element 12 or the ground, or neither.

The particles 20 may be rubber, but cork or soft plastic may also be used. Other materials are conceivable for the particles.

Any adhesive suitable for use in floors that are adhesively connected to the ground can be used in the present invention. An adhesive that stays resilient, i.e. elastic, and does not become completely hard has an advantage in that contact noise is further reduced, because both the resilient particles and the resilient adhesive dampen the transfer of noise.

Adhesives that are suitable for use in the present invention are normal adhesives, for instance adhesives on the basis of Silyl Modified Polymers. Commercially available adhesives of this type are for example: P675 Flextec supplied by Thomsit, P685 Elastic Universal by Thomsit, R850 1K Silaanglue by Bona, R845 1K Silaanglue by Bona, R860 1K Silaanglue by Bona, SMP-920 elastic glue by Stauf, SMP 930 polymer glue by Stauf, and Elastodur P-E90 by Frenken.

Other kinds of adhesives are also possible. Adhesives based on Poly Urethane (PU) may be used, for instance one component PU adhesives or two component PU adhesives. Examples are Thomsit RA-25, Thomsit P625, Thomsit P630, Bona R770, Stauf PUK 445, Stauf PUK 450, Stauf PUK 460.

Resin adhesives may also be used, for instance based on epoxy. A polychloroprene adhesive may also be used.

Dispersion adhesives, i.e. adhesives based on powder which is dissolved are also possible. The adhesives may be water-based or based on a different liquid. Examples are: cement mix, concrete mix, Eurocol uniflex 711, Eurocol special glue 705, Beamix tile glue, Beamix mortar, acrylic dispersion adhesive, plastic dispersion adhesive.

A polychloroprene dispersion adhesive may also be used. Other examples of dispersion adhesives that may be used are: Thomsit P618, Bona D720, Stauf M2A-700. Some powders provide elastic glue, others do not.

It will be clear to the skilled person that the present invention can be used with many different kinds of adhesives.

In an embodiment of the invention, the particle size is determined on the basis of a required height of the floor elements.

Figure 1B:
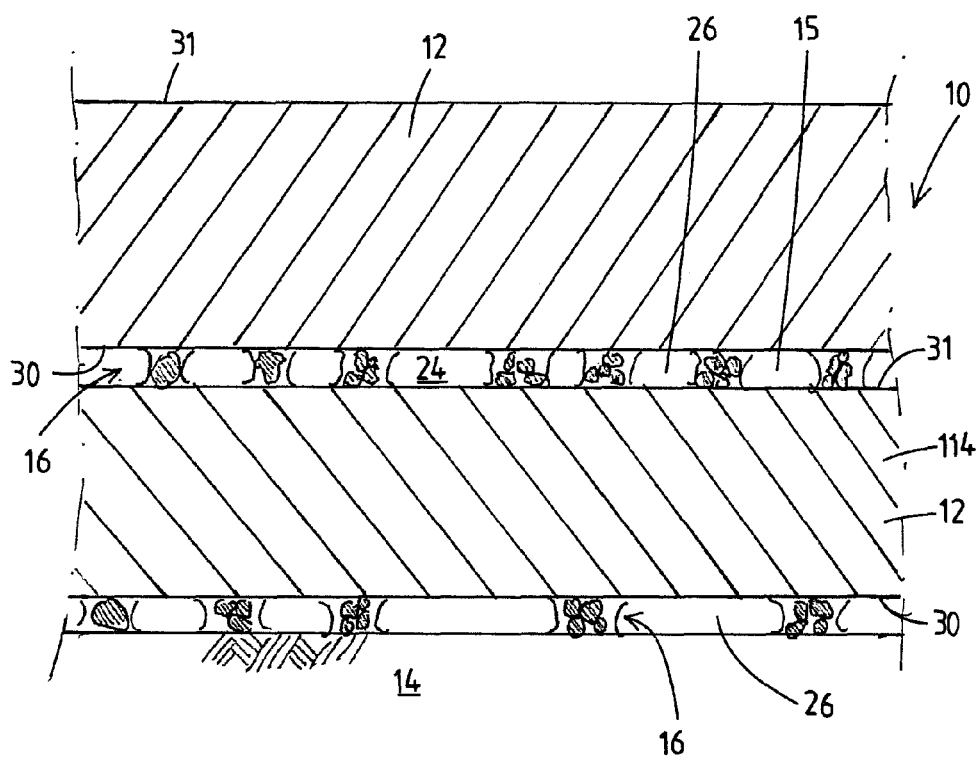
FIG. 1B shows a cross section of another embodiment or a floor according to the invention.

Turning to FIG. 1B, it is also possible that the floor element 12 is adhesively connected to an upper surface 15 of a subpanel 114 which itself is also a floor element 12 which is adhesively connected to an upper surface of the ground.

Installation of the First Embodiment of the Floor

Turning to FIG. 1, when the floor 10 is to be laid, the floor elements 12, the adhesive 18 and the particles 20 are each provided at the location. The adhesive may be provided in a container, bag, can or other means of keeping the adhesive. The particles may be in a separate bag, container, can or other means for storing the particles. The particles are loose, individual particles. It is also possible that the adhesive composition is provided in a single container which holds the mixture of the adhesive and the resilient particles.

The adhesive and the particles are mixed into the adhesive composition 16. The adhesive composition preferably comprises 5-40 percent particles by volume.

Figure 2:
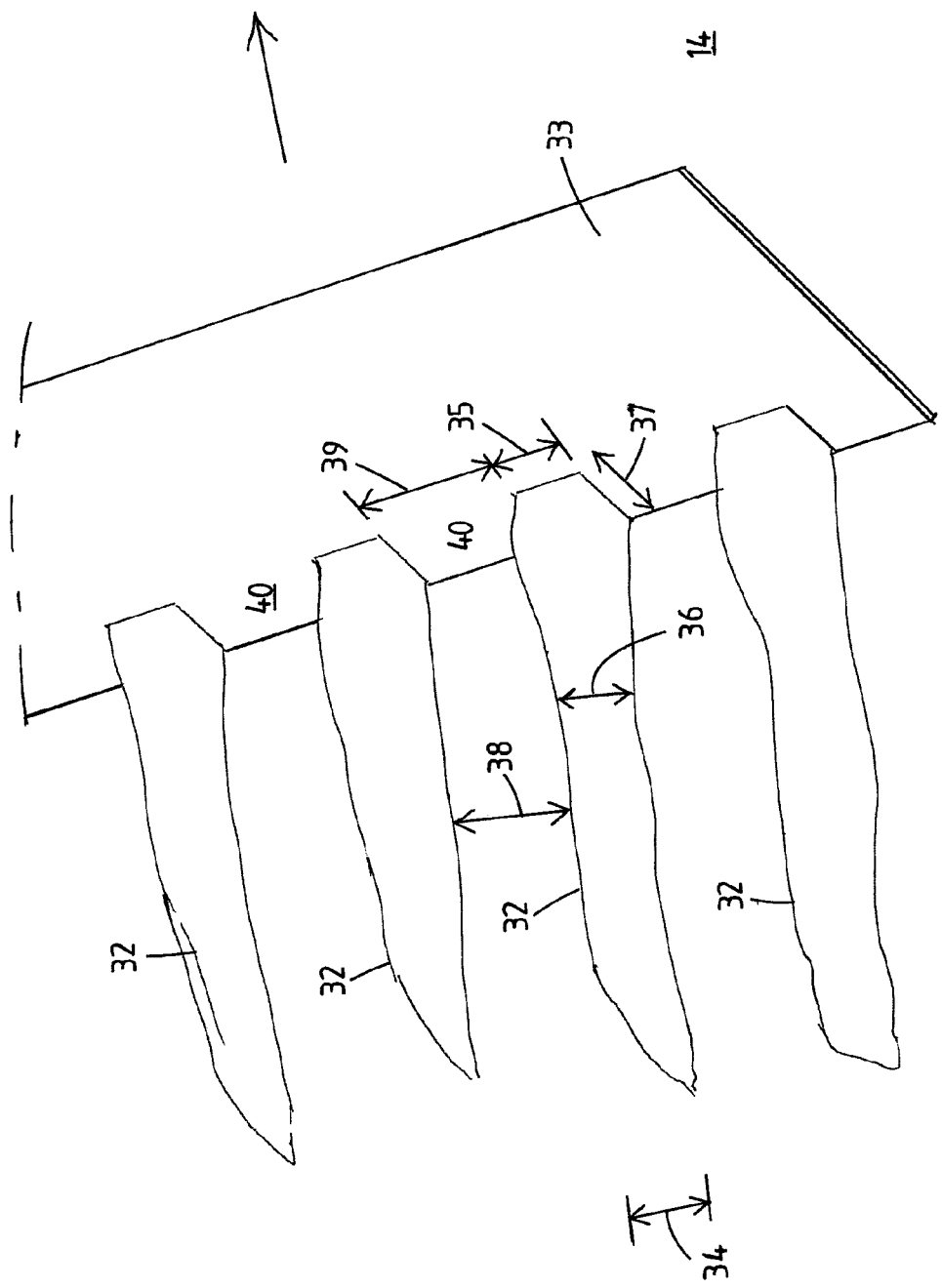
FIG. 2 shows the application of the adhesive composition.

Turning to FIG. 2, the adhesive composition 16 is applied to the underside 30 of the floor elements or to the surface 15 of the ground 14 with a glue spatula 33. The adhesive composition may be applied in ridges 32 and not cover the entire surface 15 of the ground or floor element. This saves adhesive.

The ridges 32 of the adhesive composition may have a width 34 of about 4-8 mm wide, in particular about 6 mm wide. The ridges of the adhesive composition may have a height 36 of about 4-8 mm, in particular about 6 mm. The height 36 of the ridges may be substantially equal to the width 34. The ridges 32 may be spaced at interval distances 38 of about 9-16 mm, in particular at intervals of about 11-14 mm. The ridges may be curved since a curved trajectory is easiest to make when using a spatula which is held in the hand. In a particular embodiment, the spacing 38 between the ridges is at least 1.5 times the width 34 and the height 36 of the ridges.

The glue spatula 33 may have teeth 40 with a width 39 of 9-16 mm wide and a length 37 of about 4-8 mm, in particular 6 mm. The teeth are interspaced at distances 35 of 4-8 mm, in particular 6 mm. When the glue spatula is used, the above described ridges 32 will be created, having a width 34 of between 4-8 mm, and height 36 of about 4-8 mm and interspacings 38 of about 9-16 mm. This spatula may be used for "engineered floors", tile floors, marble floors and in general floors which do not "work" a lot after installation, i.e. move or deform after installation. About 800-1100 gram per one square meter of adhesive may be applied for these floors.

Different spatulas 33 may be provided for different situations. In case a solid wood floor is laid, more adhesive may be applied, because a risk that the floor will move or deform after installation due to temperature changes or humidity changes, is relatively high. In this situation, the distances 38 between the ridges 32 will be chosen smaller. A spatula may be used which has teeth 40 having a width 39 of between 4 and 9 mm. The amount of adhesive that is used may be between 1200 and 1800 gram per m2.

The floor elements 12 are placed one by one on the ground. The ridges 32 substantially maintain their ridge shape prior to the placing of the floor elements 12 and also after the placing of the floor elements. This is due to the fact that the resilient particles make the adhesive composition quite firm, i.e. more viscous than the adhesive would be without the resilient particles.

After the floor elements are laid, the particles 20 act as spacer elements and maintain the floor elements at a distance 22 above the surface 15 of the ground 14. Contact between the floor elements 12 and the ground is prevented.

The particles may have a further advantage in that they act as ball bearings (or roller elements) under the floor elements 12. This allows easy positioning of the floor elements in a horizontal direction. To this end, the resilient particles may be substantially spherical. However, it was found that this advantage also occurs with non-spherical particles.

If the adhesive is not applied entirely correctly, this will not result in the floor element contacting the ground, because the resilient particles between the floor element and the ground act as spacers elements to prevent this. If a person walks over the floor element while the adhesive is still soft, this will also not result in contact between the floor element and the ground, because the resilient particles also prevent this.

When the adhesive 18 dries or cures, the floor 10 is ready. An adhesive may be used which stays elastic and does not become hard.

Because there is no direct contact between the floor elements and the ground 14, sound can not be transferred very well from the floor element to the ground. Further, because the total surface area of contact between the floor elements and the grounds is substantially reduced, the impact noise and vibrations are also reduced. As a result, there is relatively little impact noise and vibrations. The natural advantages of a glued floor, that it is a strong and stable floor, are substantially maintained.

In an embodiment, contact may be avoided with certainty while at the same time using less adhesive than in floors of the prior art. This is due to the fact that in an embodiment of the present invention, contrary to methods of the prior art, only a part of the surface of the floor is covered with the adhesive composition. Therefore, less contact noise can be achieved with less adhesive.

Returning to FIG. 1B, when a multilayered floor is laid, including subpanels 114, the subpanels may be adhesively connected to the ground first with the adhesive composition 16. Subsequently, the top floor element 12 is connected to the subpanel 14 via the adhesive composition.

Further Embodiment

Figure 3:
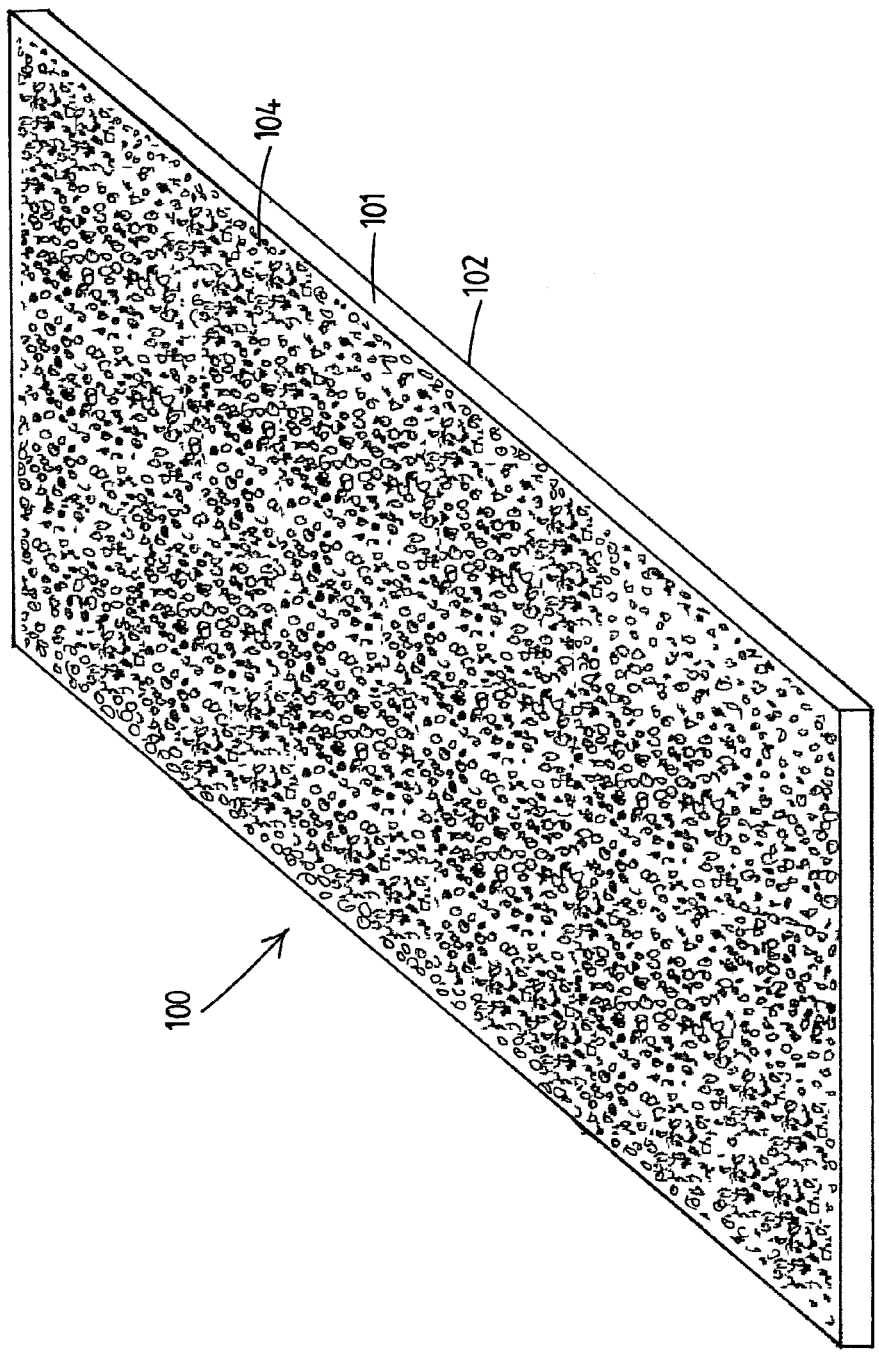
FIG. 3 shows an isometric view from the underside of another embodiment of the invention.
Figure 4:
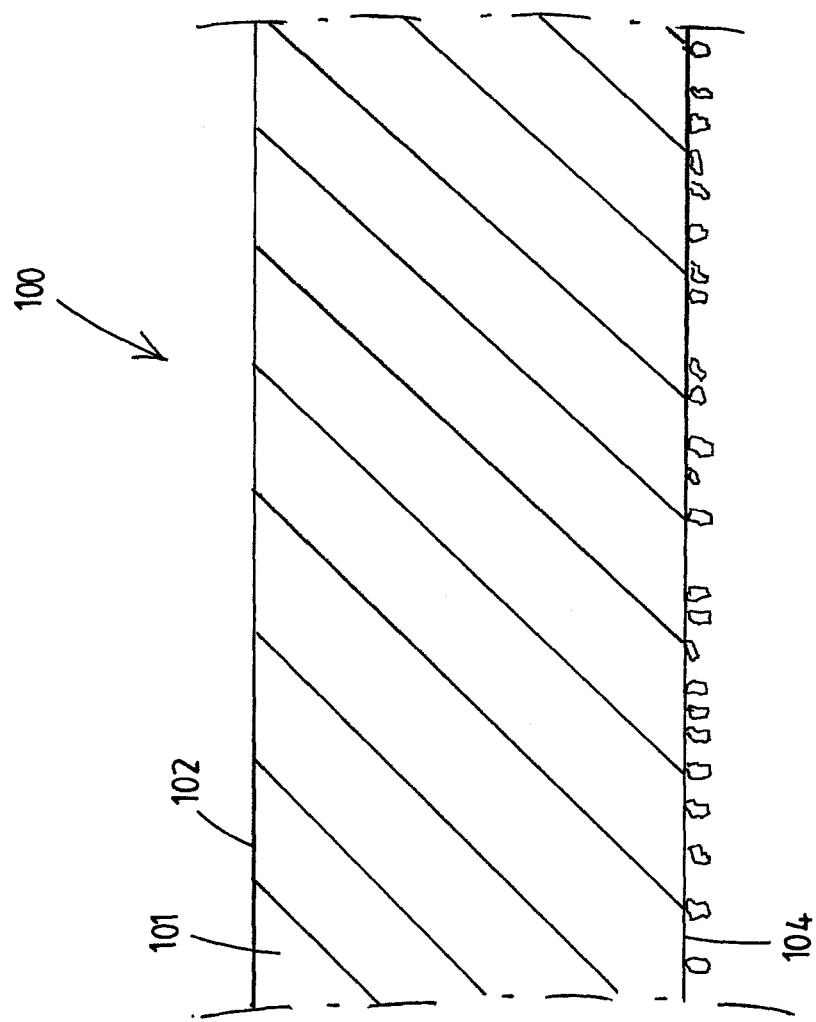
FIG. 4 shows an enlarged partial cross-section of the embodiment of FIG. 3.
Figure 5:
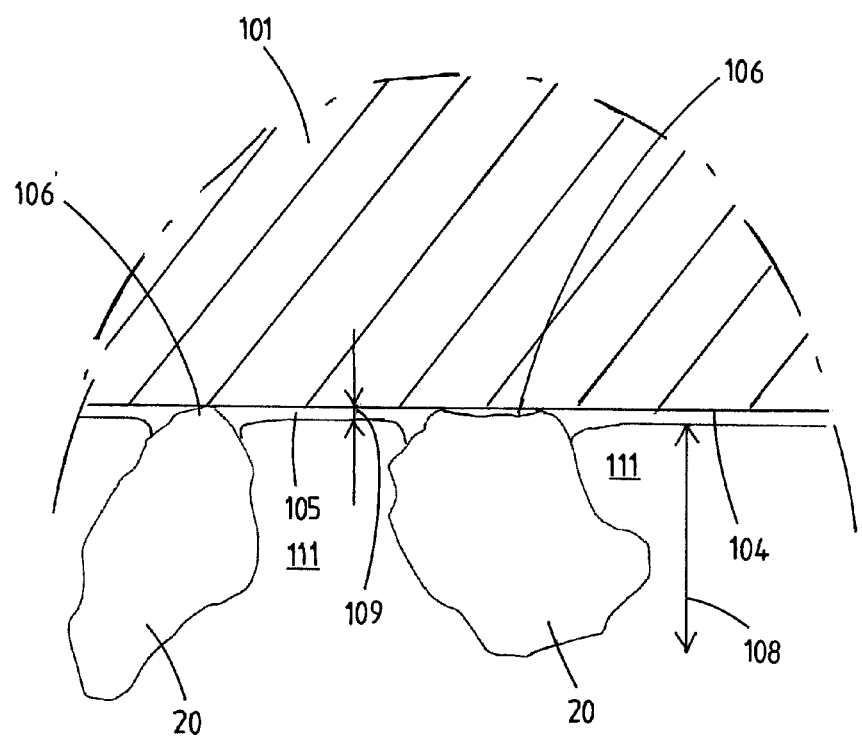
FIG. 5 shows a partial cross-section of the embodiment of FIG. 3 which is further enlarged.

Turning to FIGS. 3, 4, 5, and 6, another embodiment of the invention is shown. The embodiment relates to a floor element 100 comprising a panel 101. The floor element 100 can be a wooden panel which forms the top layer of a glued floor. The floor element may also be a chipboard or hardboard panel which forms a sublayer in a glued floor. The floor element has an upper side 102 and a underside 104. FIG. 3 shows the underside of the floor element.

The underside 104 is covered at least partially with resilient particles 20. The particles are glued to the underside via an adhesive. The particles 20 do not form a layer in the sense that they are pre-connected to one another before connection to the panel 101.

The particles have an individual character. The underside of the panel 101 remains partially visible, i.e. the particles 20 are not so densely packed that the underside becomes invisible, but leave between them small spaces through which the underside appears. If the adhesive is colored, it is the color of the adhesive which appears through the particles, as will be understood by the skilled person.

It is possible to apply the adhesive not over the entire underside 104, but only over a part of the underside, for instance in stripes, which can be broad. It will be clear that the stripes may have a pattern, but the individual particles 20 on the stripes may be substantially scattered, i.e. without a pattern.

Figure 7:
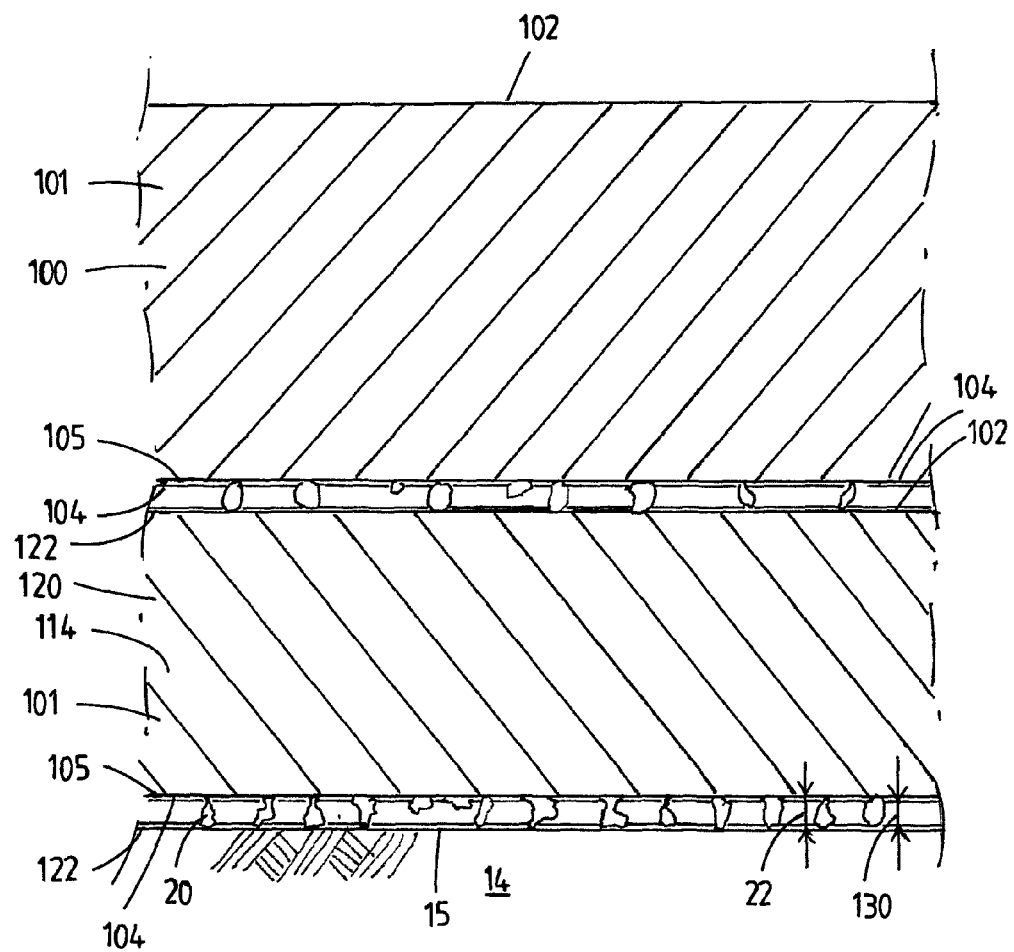
FIG. 7 shows an enlarged partial cross-section of a multi-layered floor according to the embodiment of FIG. 3.

Turning to FIG. 7, it is also possible that multiple floor elements 100, in particular two floor elements 100, 120, are stacked upon one another. A top floor element 100 can be stacked upon a lower floor element 120, which comprises a subpanel 114. Both the upper floor element 100 and the lower floor element 120 are provided on the lower surface 104 thereof with the particles 20 which are glued to the underside 104 with an adhesive layer.

Operation of Further Embodiment

The method of manufacturing the floor element 100 comprises applying adhesive to the underside 104, followed by strewing the particles over the underside 104. To this end, the panel 101 may be turned upside down prior to strewing the particles over the underside, and the particles may simply be dropped onto the surface. Any excess of particles does not stick to the underside and may simply be removed by turning the floor element in its normal orientation, i.e. with the underside facing downwards. The excess of particles simply drops from the underside 104.

Figure 6:
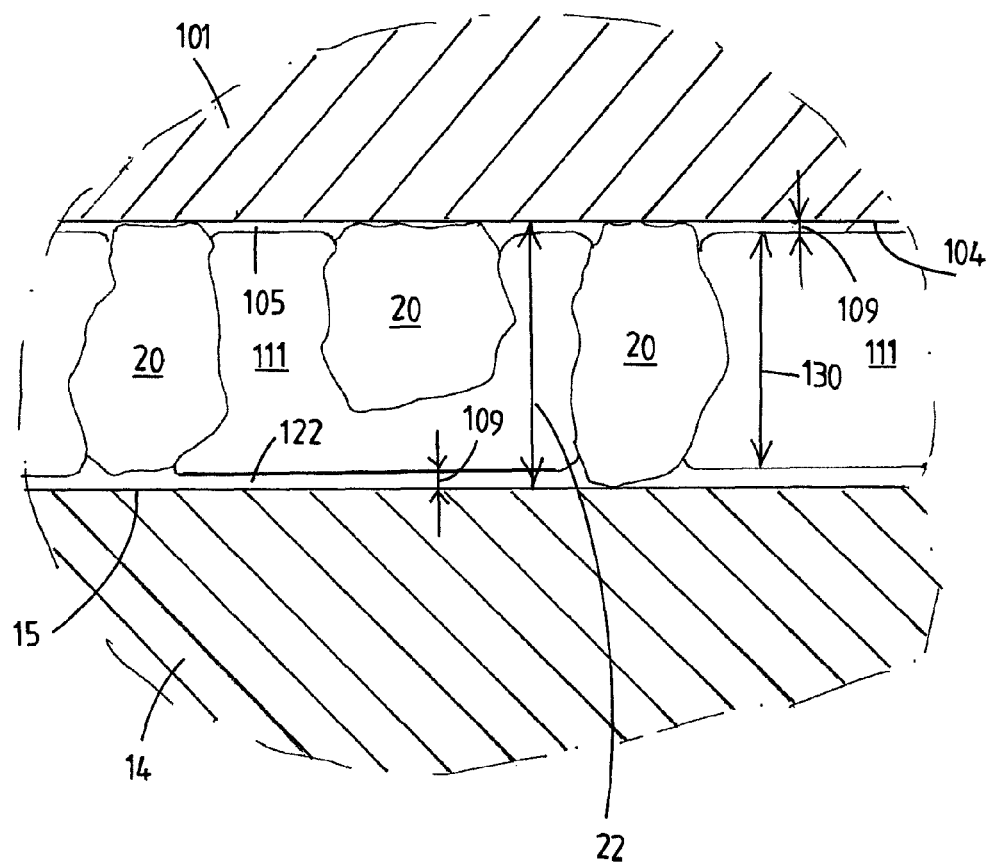
FIG. 6 shows an enlarged partial cross-section of a floor according to the embodiment of FIG. 3.

Turning to FIG. 6, when the floor element 100 is glued to the surface 15 of the ground 14, a second layer 122 of adhesive is applied to the surface 15 of the ground 14. The floor element 100 is then placed on the ground, wherein the particles contact the layer 122 of adhesive on the ground. Many particles 20 will contact the ground 14 itself. Some smaller particles 20 will not contact the layer 122 of adhesive on the ground.

The adhesive may be any of the adhesives mentioned above or any other suitable adhesive. The adhesive can be a very thin layer 105, wherein on average less than 50 percent of the surface of the particles contacts the adhesive. In particular only the side 106 of the particles which face the underside 104 contact the adhesive. The particles may project from the layer 105 of adhesive over a distance 108 of at least 50 percent of the average length of the particles. The particles project from the layer 105 of adhesive over an average distance 108 of at least twice the average thickness 109 of the layer of adhesive 105.

The second layer 122 of adhesive may also be thin. An average distance 130 between the first adhesive layer 105 and second adhesive layer 122 may be greater than twice the average thickness 109 of the adhesive layers 105, 122. Air pockets 111, which may be interconnected, may be formed between the first glue layer 105 and second glue layer 122.

Many particles 20 are only connected to the panel 101 and to the surface 15 but not to each other. The particles define interspaces 111 of air, which interspaces are interconnected. The particles are randomly scattered over the surface, as will be the logical consequence of strewing.

In the end situation, the floor element is glued to the floor 14 and is fixed at a distance 22 above the ground 14.

Returning to FIG. 7, when laying said floor, the surface 15 of the ground 14 is covered with a layer 122 of adhesive. Next, the lower floor element 120 comprising the subpanel 114 is placed on the surface 15, wherein the particles 60 on the underside 104 of the subpanel are placed in the layer 122 of adhesive. Next, the upper side 102 of the lower floor element 120 is covered with a layer 122 of adhesive. In a next step, the upper floor element 100 is placed on top of the lower floor element 120. The particles 20 on the underside 104 of the upper floor element 100 are inserted into the adhesive layer 122.

The layer of adhesive 105 may be thin, i.e. between 0.3 mm and 0.7 mm. The adhesive may be applied on the underside 30 and cover the underside 30 entirely. It is also possible that only a portion of the underside is covered.

The adhesive composition may also be applied in the same way and with the same tools as is done with adhesive without the resilient particles.

It will be recognized that the present invention has many features that are different from the ring tossing product according to U.S. Pat. No. 2,127,433. It will be obvious to a person skilled in the art that the details and the arrangement of the parts may be varied over considerable range without departing from the scope of the claims which define the invention.

The invention claimed is:

1. A floor comprising at least one floor element and an adhesive composition, wherein the at least one floor element is adhesively connected to a surface below the floor element via the adhesive composition, wherein the adhesive composition comprises a mixture of:
   an adhesive, and
   multiple resilient particles which support the floor elements, wherein the multiple resilient particles are configured to support the floor elements at a distance from the surface, wherein the particles have different shapes and varying sizes, wherein a part of the space between the surface below the floor elements and the floor elements is filled with the adhesive composition and a part of the space is filled with air.

2. The floor according to claim 1, wherein the at least one floor element is adhesively connected to a subpanel via the adhesive composition, and wherein the subpanel is adhesively connected to the underground via a second adhesive connection comprising said adhesive composition.

3. The floor according to claim 1, wherein the adhesive composition contacts only a part of the surface area (A) below the floor elements, in particular 5-50 percent of the surface area (A).

4. The floor according to claim 1, wherein the resilient particles form 5-40 percent by volume of the adhesive composition, in particular 10-20 percent by volume, more in particular 12-15 percent by volume, and wherein the resilient particles form 2-10 percent by weight of the adhesive composition, in particular 3-6 percent by weight.

5. A method of connecting one or more floor elements to a surface below the floor elements, the method comprising:
providing one or more floor elements,
providing an adhesive composition which comprises a mixture of:
an adhesive suitable for adhering floor elements to the surface below the floor elements,
multiple resilient particles configured to support the floor elements,
applying the adhesive composition on the surface below the floor elements or on the underside of the one or more floor elements,
placing the one or more floor elements on the surface, wherein the resilient particles support the floor elements,
wherein the particles have different shapes and varying sizes, wherein the adhesive composition covers only a part of the surface area (A) of the ground, in particular 5-50 percent of the surface area of the ground, and wherein, a part of a space between the surface below the floor element and the floor elements is filled with the adhesive composition and a part of the space is filled with air.

6. The method according to claim 5, wherein the at least one floor element is adhesively connected to a subpanel via the adhesive composition.

7. The method according to claim 5, wherein the subpanel is adhesively connected to the underground via a second adhesive connection comprising said adhesive composition.

8. The method according to claim 5, wherein the adhesive and the resilient particles are transported to the location where the floor is to be made separately and are mixed into the adhesive composition at said location.

9. A floor element, comprising a panel and multiple resilient particles which are adhesively connected via an adhesive to an underside of the panel, wherein the multiple resilient particles are a strewable material and wherein the multiple resilient particles are randomly scattered, and wherein interspaces of air are located between the multiple resilient particles.

10. The floor element according to claim 9, wherein the particles have different shapes and varying sizes, and wherein the interspaces of air are substantially interconnected with one another, and wherein a substantial part of the multiple resilient particles are not connected to one another, but only connected to the underside of the panel.

11. The floor element according to claim 9, wherein the particles project from the layer of adhesive over an average distance which is at least twice the average thickness of the layer of adhesive.

12. The floor comprising multiple floor elements according to claim 9, wherein the floor elements are glued to the ground or to a subpanel via a second layer of adhesive.

13. A method of manufacturing a floor element, the method comprising:
providing a panel,
applying adhesive to the underside of the panel, and
providing multiple resilient particles on the underside, wherein the multiple resilient particles are adhesively connected to the underside, and wherein interspaces of air are located between the multiple resilient particles.

* * * * *